United States Patent [19]

Elias et al.

[11] 4,425,649
[45] Jan. 10, 1984

[54] FEL GAIN ENHANCEMENT EFFECT BY A STATIC TRANSVERSE MAGNETIC FIELD WITH A LONGITUDINAL GRADIENT.

[75] Inventors: Luis R. Elias, Goleta; John M. J. Madey; Todd I. Smith, both of Palo Alto, all of Calif.

[73] Assignee: The United States of America as represented by the Secretary of the Navy, Washington, D.C.

[21] Appl. No.: 228,845

[22] Filed: Jan. 26, 1981

[51] Int. Cl.³ .................................................. H01S 3/00
[52] U.S. Cl. ............................................ 372/2; 372/37
[58] Field of Search ............................................. 372/2

[56] References Cited

U.S. PATENT DOCUMENTS

| | | | |
|---|---|---|---|
| 3,639,774 | 2/1972 | Wolff | 307/88.3 |
| 3,829,792 | 8/1974 | Born et al. | 331/94.5 PE |
| 3,883,819 | 5/1975 | Condit et al. | 331/94.5 PE |
| 3,958,189 | 5/1976 | Sprangle et al. | 331/94.5 PE |
| 4,035,741 | 7/1977 | Crisp et al. | 331/94.5 G |
| 4,047,125 | 9/1977 | Dreyfus | 331/94.5 PE |
| 4,121,176 | 10/1978 | Golden et al. | 331/94.5 G |
| 4,126,833 | 11/1978 | Hundstad et al. | 331/94.5 PE |
| 4,283,687 | 8/1981 | Madey et al. | 372/2 |

Primary Examiner—William L. Sikes
Assistant Examiner—Léon Scott, Jr.
Attorney, Agent, or Firm—R. F. Beers; Charles D. B. Curry; George L. Craig

[57] ABSTRACT

An apparatus and method is described for greatly enhancing the power output of a free electron laser. To enhance the electron kinetic energy that is converted to laser radiation, the wave amplification resonance condition is continuously changed along the length of the laser interaction region. The changing resonance condition is achieved by use of a static magnetic field transverse to the injected electron beam, the magnetic field having a longitudinal magnetic field gradient.

2 Claims, 2 Drawing Figures

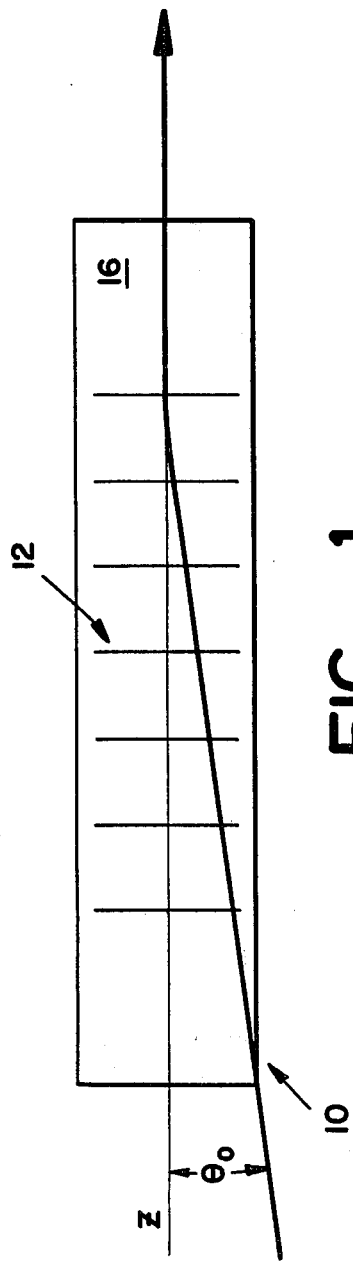
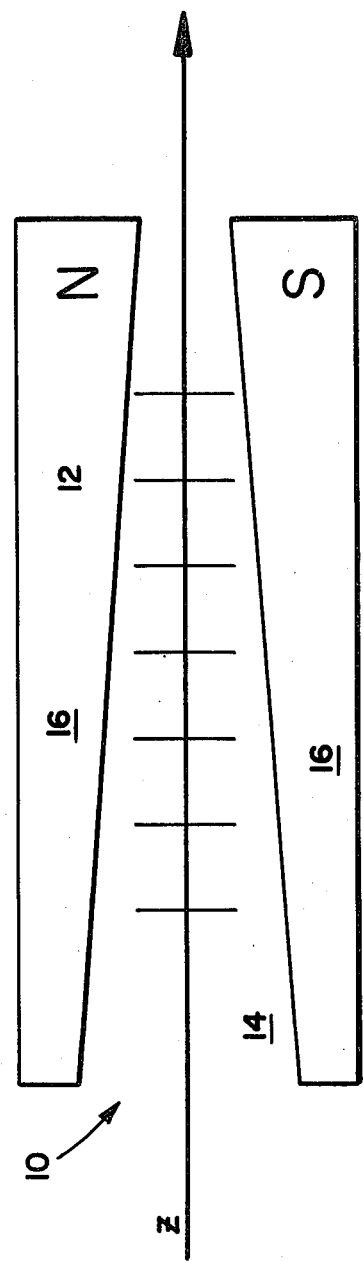

FEL GAIN ENHANCEMENT EFFECT BY A STATIC TRANSVERSE MAGNETIC FIELD WITH A LONGITUDINAL GRADIENT

BACKGROUND OF THE INVENTION

1. Field of the Invention.

The present invention relates to an apparatus and method for enhancing the power output of a free electron laser (FEL). More particularly the present invention relates to changing the wave amplification resonance condition along the length of the interaction region between the electron beam and the applied magnetic field.

2. Description of the Prior Art.

In construction of a FEL it is highly desirable to continuously change the wave amplification resonance condition of an electron interacting with a pump field along the length of the interaction region to enhance the amount of electron kinetic energy that can be converted to laser radiation. Techniques within prior art have been developed to perform this continuous change when the resonance condition is sensitive to changes in the magnitude of the pump wave magnetic field intensity, or when the period of the pump wave can be continuously decreased as the electron passes through the interaction region. There are, however, cases in which the effects described above as produced by either of the defined techniques are too small to be practically implemented. For these and other similar cases the present invention provides a technique producing significant effects whereby the local resonance conditions can be continuously changed along the laser interaction region by using a static transverse magnetic field having a longitudinal magnetic field gradient.

SUMMARY OF THE INVENTION

The present invention is summarized as an apparatus and method for greatly enhancing the power output of a free electron laser. The wave amplification resonance condition of the instant invention is continuously changed along the length of the laser interaction region in order to enhance the electron kinetic energy that can be converted to laser radiation. The changing resonance condition is achieved by using a static magnetic field transverse to the injected electron beam and by ensuring that the magnetic field has a longitudinal magnetic field gradient.

A primary object of the invention is to provide an apparatus and method for greatly enhancing the power output of a free electron laser.

Another object of the invention is to provide a FEL having a magnetic field with a longitudinal magnetic field gradient such that the wave amplification resonance condition is continuously changed along the length of the laser interaction region.

Other objects, advantages and novel features will be apparent from the following detailed description when read in conjunction with the appended claims and attached drawing.

BRIEF DESCRIPTION OF THE DRAWING

FIGS. 1 and 2 are schematics of the present invention showing the continuously changing path of the electron beam traversing the laser interaction region under the influence of the pump field and the static magnetic field with a longitudinal magnetic field gradient.

DESCRIPTION OF THE PREFERRED EMBODIMENT

The technique of the present invention is based on the dependence of resonance energy on the angle between the injected electron velocity vector and the axis of propagation of the pump wave. Referring to FIGS. 1 and 2, the electron beam 10 is injected into and along the optical axis Z of the laser cavity resonator, not shown, at a small initial angle $\theta_o$ with respect to the axis of propagation of the pump wave 12 which coincides with the optical axis of the cavity. Both the electron beam 10 and the pump wave 12 are caused to pass through the interaction region 14 of a bending magnet 16 which exerts a static transverse magnetic field on the electron beam 10. Because the interaction region 14 has a larger opening at the point of insertion of the electron beam 10 and has a smaller opening of the point of exit, a longitudinal magnetic field gradient is imposed on the beam 10. Thus as the electron beam 10 traverses the interaction region 14, the static field of the bending magnet 16 continually bends the direction of motion of the electron beam 10 such that as the electron energy $\gamma(Z)$ decreases the effective pump wavelength decreases to maintain a constant difference between $\gamma(Z)$ and $\gamma_r(Z)$ where $\gamma_r(Z)$ is the local resonance energy.

When a static transverse magnetic field having a longitudinal field gradient is applied to the interaction region of a FEL as with the present invention, the resonance energy $\gamma_R$ has the following form:

$$\gamma_R^2 = \frac{\lambda + \lambda_p}{4\lambda}\left[1 + \frac{e^2 A_o^2(t)}{m^2 c^4} + \frac{e^2 <A_p^2>}{m^2 c^4}\right]$$

where
$\lambda$ = laser wavelength
$\lambda_p$ = pump wavelength
$A_o(Z)$ = magnetic vector potential function for the bending magnet
$<A_p^2>$ = mean value of the square of the pump wave vector potential For a short pump wavelength the third term inside the square brackets can be ignored.

Given the dependence of $\gamma$ on Z, position along the optical axis of the interaction region 14, the above equation can be solved for $A_o(Z)$ subject to the constraint $\gamma(Z) - \gamma_R(Z)$ = constant. This constraint maximizes the rate at which energy is transferred from the electron beam to coherent optical radiation. The magnetic field equation can then be derived from $B = \nabla \times A_o$.

With this new technique the amount of electron kinetic energy converted to laser energy can be increased tenfold. Further it is applicable to a number of cases where increased conversion is highly desirable but where conventional techniques produce effects too small to be practically implemented.

What is claimed is:

1. An apparatus for enhancing the conversion of electron energy to laser energy within a free electron laser, the improvement residing in:
  (a) means for injecting an electron beam into said laser at a predetermined angle to a segment of the optical axis of said laser;
  (b) means for generating a pump wave of predetermined frequency within said laser such that said pump wave oscillates along and has phase fronts perpendicular to said optical axis of said laser; and (c) means for producing a static magnetic field having a field vector transverse to and a longitudinal field gradient along said segment of said optical axis of said laser, said magnetic field defining an interaction zone along said segment of said optical axis between said electron beam, said pump wave and said magnetic field in which said conversion of energy from said electron beam to said laser energy is greatly increased.

2. The apparatus of claim 4 wherein said static magnetic field is produced by a bending magnet having the longitudinal axis of said magnet coincident with said optical axis of said laser, said bending magnet having a longitudinally tapering gap about said segment defining said interaction zone.

* * * * *